(12) United States Patent
Roweth et al.

(10) Patent No.: US 11,792,114 B2
(45) Date of Patent: Oct. 17, 2023

(54) SYSTEM AND METHOD FOR FACILITATING EFFICIENT MANAGEMENT OF NON-IDEMPOTENT OPERATIONS IN A NETWORK INTERFACE CONTROLLER (NIC)

(71) Applicant: Hewlett Packard Enterprise Development LP, Houston, TX (US)

(72) Inventors: Duncan Roweth, Bristol Avon (GB); Robert L. Alverson, Seattle, WA (US); Albert Cheng, Bellevue, WA (US); Timothy J. Johnson, Sun Prairie, WI (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/594,548

(22) PCT Filed: Mar. 23, 2020

(86) PCT No.: PCT/US2020/024304
§ 371 (c)(1),
(2) Date: Oct. 21, 2021

(87) PCT Pub. No.: WO2020/236294
PCT Pub. Date: Nov. 26, 2020

(65) Prior Publication Data
US 2022/0200897 A1 Jun. 23, 2022

Related U.S. Application Data

(60) Provisional application No. 62/852,203, filed on May 23, 2019, provisional application No. 62/852,273, (Continued)

(51) Int. Cl.
*H04L 12/26* (2006.01)
*H04L 45/28* (2022.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS 5,138,615 A 8/1992 Lamport et al.
5,457,687 A 10/1995 Newman
(Continued)

FOREIGN PATENT DOCUMENTS

CN 101729609 A 6/2010
CN 102932203 A 2/2013
(Continued)

OTHER PUBLICATIONS

International Search Report and Written Opinion received for PCT Application No. PCT/US2020/024304, dated Jul. 15, 2020, 11 pages.
(Continued)

*Primary Examiner* — Zewdu A Beyen
(74) *Attorney, Agent, or Firm* — Yao Legal Services, Inc.

(57) ABSTRACT

A network interface controller (NIC) capable of efficient management of non-idempotent operations is provided. The NIC can be equipped with a network interface, storage management logic block, and an operation management logic block. During operation, the network interface can receive a request for an operation from a remote device. The storage management logic block can store, in a local data structure, outcome of operations executed by the NIC. The operation management logic block can determine whether the NIC has previously executed the operation. If the NIC has previously executed the operation, the operation man-
(Continued)

agement logic block can obtain an outcome of the operation from the data structure and generate a response comprising the obtained outcome for responding to the request.

20 Claims, 7 Drawing Sheets

Related U.S. Application Data filed on May 23, 2019, provisional application No. 62/852,289, filed on May 23, 2019.

(51) Int. Cl.

| | | |
|---|---|---|
| *H04L 45/028* | (2022.01) | |
| *H04L 45/125* | (2022.01) | |
| *H04L 45/00* | (2022.01) | |
| *H04L 45/122* | (2022.01) | |
| *H04L 47/76* | (2022.01) | |
| *H04L 49/15* | (2022.01) | |
| *H04L 49/00* | (2022.01) | |
| *H04L 69/40* | (2022.01) | |
| *H04L 47/10* | (2022.01) | |
| *H04L 49/9005* | (2022.01) | |
| *H04L 47/34* | (2022.01) | |
| *H04L 67/1097* | (2022.01) | |
| *G06F 13/16* | (2006.01) | |
| *H04L 45/021* | (2022.01) | |
| *H04L 47/12* | (2022.01) | |
| *G06F 13/42* | (2006.01) | |
| *H04L 47/2441* | (2022.01) | |
| *H04L 47/30* | (2022.01) | |
| *H04L 47/62* | (2022.01) | |
| *H04L 47/24* | (2022.01) | |
| *H04L 49/90* | (2022.01) | |
| *G06F 13/38* | (2006.01) | |
| *G06F 13/40* | (2006.01) | |
| *H04L 45/745* | (2022.01) | |
| *H04L 47/2483* | (2022.01) | |
| *H04L 47/629* | (2022.01) | |
| *H04L 47/80* | (2022.01) | |
| *H04L 49/101* | (2022.01) | |
| *H04L 45/12* | (2022.01) | |
| *H04L 47/122* | (2022.01) | |
| *G06F 12/1036* | (2016.01) | |
| *G06F 15/173* | (2006.01) | |
| *H04L 43/10* | (2022.01) | |
| *H04L 45/42* | (2022.01) | |
| *H04L 47/11* | (2022.01) | |
| *G06F 12/0862* | (2016.01) | |
| *G06F 12/1045* | (2016.01) | |
| *H04L 47/32* | (2022.01) | |
| *G06F 9/54* | (2006.01) | |
| *G06F 13/14* | (2006.01) | |
| *G06F 9/50* | (2006.01) | |
| *H04L 47/22* | (2022.01) | |
| *H04L 47/52* | (2022.01) | |
| *H04L 47/6275* | (2022.01) | |
| *H04L 45/24* | (2022.01) | |
| *H04L 45/7453* | (2022.01) | |
| *H04L 45/16* | (2022.01) | |
| *H04L 69/22* | (2022.01) | |
| *H04L 47/762* | (2022.01) | |
| *H04L 47/78* | (2022.01) | |
| *H04L 47/20* | (2022.01) | |
| *H04L 49/9047* | (2022.01) | |
| *H04L 1/00* | (2006.01) | |
| *H04L 43/0876* | (2022.01) | |
| *H04L 47/2466* | (2022.01) | |
| *H04L 47/625* | (2022.01) | |
| *H04L 69/28* | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/626* (2013.01); *H04L 47/629* (2013.01); *H04L 47/6235* (2013.01); *H04L 47/6275* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

| | | |
|---|---|---|
| 5,937,436 A | 8/1999 | Watkins |
| 5,960,178 A | 9/1999 | Cochinwala et al. |
| 5,983,332 A | 11/1999 | Watkins |
| 6,112,265 A | 8/2000 | Harriman et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,714,553 B1 | 3/2004 | Poole et al. |
| 6,728,211 B1 | 4/2004 | Peris et al. |
| 6,732,212 B2 * | 5/2004 | Sugahara ............... G06F 13/24 709/236 |
| 6,735,173 B1 | 5/2004 | Lenoski et al. |

(56) References Cited

U.S. PATENT DOCUMENTS

| | | |
|---|---|---|
| 6,894,974 B1 | 5/2005 | Aweva et al. |
| 7,023,856 B1 | 4/2006 | Washabaugh et al. |
| 7,133,940 B2 | 11/2006 | Blightman et al. |
| 7,218,637 B1 | 5/2007 | Best et al. |
| 7,269,180 B2 | 9/2007 | Bly et al. |
| 7,337,285 B2 | 2/2008 | Tanoue |
| 7,397,797 B2 | 7/2008 | Eri et al. |
| 7,430,559 B2 | 9/2008 | Lomet |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,719,543 B2 | 5/2014 | Kaminski et al. |
| 8,811,183 B1 | 8/2014 | Anand et al. |
| 8,948,175 B2 | 2/2015 | Bly et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,286,236 B2 | 3/2016 | Auernhammer et al. |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | Mckelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | Macnamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,740,243 B1 | 8/2020 | Benisty |
| 10,802,828 B1 | 10/2020 | Volpe et al. |
| 10,817,502 B2 | 10/2020 | Talagala et al. |
| 11,416,749 B2 | 8/2022 | Bshara et al. |
| 2001/0010692 A1 | 8/2001 | Sindhu et al. |
| 2001/0047438 A1 | 11/2001 | Forin |
| 2002/0152328 A1 | 10/2002 | Kagan et al. |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0091055 A1 | 5/2003 | Craddock et al. |
| 2003/0110455 A1 | 6/2003 | Baumgartner et al. |
| 2003/0174711 A1 | 9/2003 | Shankar |
| 2003/0223420 A1 | 12/2003 | Ferolito |
| 2004/0008716 A1 | 1/2004 | Stiliadis |
| 2004/0049580 A1 | 3/2004 | Boyd et al. |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0173970 A1 | 8/2006 | Pope et al. |
| 2006/0174251 A1 | 8/2006 | Pope et al. |
| 2007/0061433 A1 | 3/2007 | Reynolds et al. |
| 2007/0198804 A1 | 8/2007 | Moyer |
| 2007/0242611 A1 | 10/2007 | Archer et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0126553 A1 | 5/2008 | Boucher et al. |
| 2008/0147881 A1 | 6/2008 | Krishnamurthy et al. |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0055496 A1 | 2/2009 | Garg et al. |
| 2009/0092046 A1 | 4/2009 | Naven et al. |
| 2009/0141621 A1 | 6/2009 | Fan et al. |
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |

(56) References Cited

U.S. PATENT DOCUMENTS

| | | |
|---|---|---|
| 2011/0164496 A1 | 7/2011 | Loh et al. |
| 2011/0173370 A1 | 7/2011 | Jacobs et al. |
| 2011/0264822 A1 | 10/2011 | Ferguson et al. |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0300669 A1 | 11/2012 | Zahavi |
| 2012/0307838 A1 | 12/2012 | Manula et al. |
| 2012/0314707 A1 | 12/2012 | Epps et al. |
| 2013/0010636 A1 | 1/2013 | Regula |
| 2013/0039169 A1 | 2/2013 | Schlansker et al. |
| 2013/0060944 A1 | 3/2013 | Archer et al. |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0290673 A1 | 10/2013 | Archer et al. |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0003427 A1 | 1/2014 | Nishi et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0301390 A1 | 10/2014 | Scott et al. |
| 2014/0307554 A1 | 10/2014 | Basso et al. |
| 2014/0328172 A1 | 11/2014 | Kumar et al. |
| 2014/0347997 A1 | 11/2014 | Bergamasco et al. |
| 2014/0362698 A1 | 12/2014 | Arad |
| 2014/0369360 A1 | 12/2014 | Carlstrom |
| 2015/0003247 A1 | 1/2015 | Mejia et al. |
| 2015/0006849 A1 | 1/2015 | Xu et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0220481 A1 | 8/2015 | Tanimoto |
| 2015/0244617 A1 | 8/2015 | Nakil et al. |
| 2015/0244804 A1 | 8/2015 | Warfield et al. |
| 2015/0263955 A1 | 9/2015 | Talaski et al. |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134559 A1 | 5/2016 | Abel et al. |
| 2016/0142318 A1 | 5/2016 | Beecroft |
| 2016/0154756 A1 | 6/2016 | Dodson et al. |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0342567 A1 | 11/2016 | Tsirkin |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |
| 2017/0048144 A1 | 2/2017 | Liu |
| 2017/0054633 A1 | 2/2017 | Underwood et al. |
| 2017/0091108 A1 | 3/2017 | Arellano et al. |
| 2017/0093770 A1 | 3/2017 | Flajslik et al. |
| 2017/0097840 A1 | 4/2017 | Bridgers |
| 2017/0103108 A1 | 4/2017 | Datta et al. |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0237671 A1 | 8/2017 | Rimmer et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | Mckelvie et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0152317 A1 | 5/2018 | Chang et al. |
| 2018/0152357 A1 | 5/2018 | Natham et al. |
| 2018/0191609 A1 | 7/2018 | Caulfield et al. |
| 2018/0191742 A1 | 7/2018 | Dawes |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |

(56) References Cited

U.S. PATENT DOCUMENTS

| | | | |
|---|---|---|---|
| 2019/0042337 | A1 | 2/2019 | Dinan et al. |
| 2019/0044809 | A1 | 2/2019 | Willis et al. |
| 2019/0044827 | A1 | 2/2019 | Ganapathi et al. |
| 2019/0044872 | A1 | 2/2019 | Ganapathi et al. |
| 2019/0044875 | A1 | 2/2019 | Murty et al. |
| 2019/0052327 | A1 | 2/2019 | Motozuka et al. |
| 2019/0058663 | A1 | 2/2019 | Song |
| 2019/0068501 | A1 | 2/2019 | Schneider et al. |
| 2019/0095134 | A1 | 3/2019 | Li |
| 2019/0104057 | A1 | 4/2019 | Goel et al. |
| 2019/0108106 | A1 | 4/2019 | Aggarwal et al. |
| 2019/0108332 | A1 | 4/2019 | Glew et al. |
| 2019/0109791 | A1 | 4/2019 | Mehra et al. |
| 2019/0140979 | A1 | 5/2019 | Levi et al. |
| 2019/0146477 | A1 | 5/2019 | Cella et al. |
| 2019/0196982 | A1 | 6/2019 | Rozas et al. |
| 2019/0199646 | A1 | 6/2019 | Singh et al. |
| 2019/0280978 | A1 | 9/2019 | Schmatz et al. |
| 2019/0294575 | A1 | 9/2019 | Dennison et al. |
| 2019/0332314 | A1 | 10/2019 | Zhang et al. |
| 2019/0361728 | A1 | 11/2019 | Kumar et al. |
| 2019/0379610 | A1 | 12/2019 | Srinivasan et al. |
| 2020/0145725 | A1* | 5/2020 | Eberle ................ H04N 21/2387 |
| 2020/0177505 | A1 | 6/2020 | Li |
| 2021/0152494 | A1 | 5/2021 | Johnsen et al. |
| 2021/0263779 | A1 | 8/2021 | Haghighat et al. |
| 2021/0334206 | A1 | 10/2021 | Colgrove et al. |
| 2021/0377156 | A1 | 12/2021 | Michael et al. |
| 2022/0197831 | A1 | 6/2022 | Gorodetsky et al. |
| 2022/0210058 | A1 | 6/2022 | Bataineh et al. |
| 2022/0217101 | A1* | 7/2022 | Yefet .................... H04L 49/253 |
| 2022/0329521 | A1 | 10/2022 | Roweth et al. |

FOREIGN PATENT DOCUMENTS

| | | |
|---|---|---|
| CN | 110324249 A | 10/2019 |
| CN | 110601888 A | 12/2019 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

OTHER PUBLICATIONS

International Search Report and Written Opinion received for PCT Patent Application No. PCT/US20/24340, dated Oct. 26, 2020, 9 pages.

International Search Report and Written Opinion received for PCT Patent Application No. PCT/US20/24342, dated Oct. 27, 2020,10 pages.

International Search Report and Written Opinion received for PCT Patent Application No. PCT/US2020/024192, dated Oct. 23, 2020, 9 pages.

International Search Report and Written Opinion received for PCT Patent Application No. PCT/US2020/024221, dated Oct. 26, 2020, 9 pages.

International Search Report cited in PCT/US2020/024170 dated Dec. 16, 2020; 3 pages.

Maabi, S., et al.; "ERFAN: Efficient reconfigurable fault-tolerant deflection routing algorithm for 3-D Network-on-Chip" Sep. 6-9, 2016.

Maglione-Mathey, G., et al.; "Scalable Deadlock-Free Deterministic Minimal-Path Routing Engine for InfiniBand-Based Dragonfly Networks"; Aug. 21, 2017; 15 pages.

Mamidala, A.R., et al.; "Efficient Barrier and Allreduce on Infiniband clusters using multicast and adaptive algorithms" Sep. 20-23, 2004; 10 pages.

Mammeri, Z; "Reinforcement Learning Based Routing in Networks: Review and Classification of Approaches"; Apr. 29, 2019; 35 pages.

Mollah; M. A., et al.; "High Performance Computing Systems. Performance Modeling, Benchmarking, and Simulation 8th International Workshop"; Nov. 13, 2017.

Open Networking Foundation; "OpenFlow Switch Specification"; Mar. 26, 2015; 283 pages.

Prakash, P., et al.; "The TCP Outcast Problem: Exposing Unfairness in Data Center Networks"; 2011; 15 pages.

Ramakrishnan, K., et al.; "The Addition of Explicit Congestion Notification (ECN) to IP"; Sep. 2001; 63 pages.

Roth, P. C., et al.; "MRNet: A Software-Based Multicast/Reduction Network for Scalable Tools1"; Nov. 15-21, 2003; 16 pages.

Silveira, J., et al.; "Preprocessing of Scenarios for Fast and Efficient Routing Reconfiguration in Fault-Tolerant NoCs" Mar. 4-6, 2015.

Tsunekawa, K.; "Fair bandwidth allocation among LSPs for AF class accommodating TCP and UDP traffic in a Diffserv-capable MPLS network"; Nov. 17, 2005; 9 pages.

Underwood, K.D., et al.; "A hardware acceleration unit for MPI queue processing"; Apr. 18, 2005; 10 pages.

Wu, J.; "Fault-tolerant adaptive and minimal routing in mesh-connected multicomputers using extended safety levels" Feb. 2000; 11 pages.

Xiang, D., et al.; "Fault-Tolerant Adaptive Routing in Dragonfly Networks"; Apr. 12, 2017; 15 pages.

Xiang, D., et al.; "Deadlock-Free Broadcast Routing in Dragonfly Networks without Virtual Channels", submission to IEEE transactions on Parallel and Distributed Systems, 2015, 15 pages.

Awerbuch, B., et al.; "An On-Demand Secure Routing Protocol Resilient to Byzantine Failures"; Sep. 2002; 10 pages.

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.

Bhatele, A., et al.; "Analyzing Network Health and Congestion in Dragonfly-based Supercomputers"; May 23-27, 2016; 10 pages.

Blumrich, M.A., et al.; "Exploiting Idle Resources in a High-Radix Switch for Supplemental Storage"; Nov. 2018; 13 pages.

Chang, F., et al.; "PVW: Designing Vir PVW: Designing Virtual World Ser orld Server Infr er Intiastructur astructure"; 2010; 8 pages.

Chang, F., et al; "PVW: Designing Virtual World Server Infrastructure"; 2010; 8 pages.

Chen, F., et al.; "Requirements for RoCEv3 Congestion Management"; Mar. 21, 2019; 8 pages.

Cisco Packet Tracer; "packet-tracer;—ping"; https://www.cisco.com/c/en/us/td/docs/security/asa/asa-command-reference/1-R/cmdref2/p1.html; 2017.

Cisco; "Understanding Rapid Spanning Tree Protocol (802.1w)"; Aug. 1, 2017; 13 pages.

Eardley, ED, P; "Pre-Congestion Notification (PCN) Architecture"; Jun. 2009; 54 pages.

Escudero-Sahuquillo, J., et al.; "Combining Congested-Flow Isolation and Injection Throttling in HPC Interconnection Networks"; Sep. 13-16, 2011; 3 pages.

(56) References Cited

OTHER PUBLICATIONS

Hong, Y.; "Mitigating the Cost, Performance, and Power Overheads Induced by Load Variations in Multicore Cloud Servers"; Fall 2013; 132 pages.
Huawei; "The Lossless Network For Data Centers"; Nov. 7, 2017; 15 pages.
International Search Report and Written Opinion received for PCT Application No. PCT/US2020/024248, dated Jul. 8, 2020, 11 pages.
International Search Report and Written Opinion received for PCT Application No. PCT/US20/024332, dated Jul. 8, 2020, 13 pages.
International Search Report and Written Opinion received for PCT Application No. PCT/US20/24243, dated Jul. 9, 2020, 10 pages.
International Search Report and Written Opinion received for PCT Application No. PCT/US20/24253, dated Jul. 6, 2020, 12 pages.
International Search Report and Written Opinion received for PCT Application No. PCT/US20/24256, dated Jul. 7, 2020, 11 pages.
International Search Report and Written Opinion received for PCT Application No. PCT/US20/24257, dated Jul. 7, 2020, 10 pages.
International Search Report and Written Opinion received for PCT Application No. PCT/US20/24258, dated Jul. 7, 2020, 9 pages.
International Search Report and Written Opinion received for PCT Application No. PCT/US20/24259, dated Jul. 9, 2020, 13 pages.
International Search Report and Written Opinion received for PCT Application No. PCT/US20/24260, dated Jul. 7, 2020, 11 pages.
International Search Report and Written Opinion received for PCT Application No. PCT/US20/24268, dated Jul. 9, 2020, 11 pages.
International Search Report and Written Opinion received for PCT Application No. PCT/US20/24269, dated Jul. 9, 2020, 11 pages.
International Search Report and Written Opinion received for PCT Application No. PCT/US20/24339, dated Jul. 8, 2020, 11 pages.
International Search Report and Written Opinion received for PCT Application No. PCT/US2020/024125, dated Jul. 10, 2020, 5 pages.
International Search Report and Written Opinion received for PCT Application No. PCT/US2020/024129, dated Jul. 10, 2020, 11 pages.
International Search Report and Written Opinion received for PCT Application No. PCT/US2020/024237, dated Jul. 14, 2020, 5 pages.
International Search Report and Written Opinion received for PCT Application No. PCT/US2020/024239, dated Jul. 14, 2020, 11 pages.
International Search Report and Written Opinion received for PCT Application No. PCT/US2020/024241, dated Jul. 14, 2020, 13 pages.
International Search Report and Written Opinion received for PCT Application No. PCT/US2020/024242, dated Jul. 6, 2020, 11 pages.
International Search Report and Written Opinion received for PCT Application No. PCT/US2020/024244, dated Jul. 13, 2020, 10 pages.
International Search Report and Written Opinion received for PCT Application No. PCT/US2020/024245, dated Jul. 14, 2020, 11 pages.
International Search Report and Written Opinion received for PCT Application No. PCT/US2020/024246, dated Jul. 14, 2020, 10 pages.
International Search Report and Written Opinion received for PCT Application No. PCT/US2020/024250, dated Jul. 14, 2020, 12 pages.
International Search Report and Written Opinion received for PCT Application No. PCT/US2020/024254, dated Jul. 13, 2020, 10 pages.
International Search Report and Written Opinion received for PCT Application No. PCT/US2020/024262, dated Jul. 13, 2020, 10 pages.
International Search Report and Written Opinion received for PCT Application No. PCT/US2020/024266, dated Jul. 9, 2020, 10 pages.
International Search Report and Written Opinion received for PCT Application No. PCT/US2020/024270, dated Jul. 10, 2020, 13 pages.
International Search Report and Written Opinion received for PCT Application No. PCT/US2020/024271, dated Jul. 9, 2020, 10 pages.
International Search Report and Written Opinion received for PCT Application No. PCT/US2020/024272, dated Jul. 9, 2020, 10 pages.
International Search Report and Written Opinion received for PCT Application No. PCT/US2020/024276, dated Jul. 13, 2020, 9 pages.
International Search Report and Written Opinion received for PCT Application No. PCT/US2020/024311, dated Jul. 17, 2020, 8 pages.
International Search Report and Written Opinion received for PCT Application No. PCT/US2020/024321, dated Jul. 9, 2020, 9 pages.
International Search Report and Written Opinion received for PCT Application No. PCT/US2020/024324, dated Jul. 14, 2020, 10 pages.
International Search Report and Written Opinion received for PCT Application No. PCT/US2020/024327, dated Jul. 10, 2020, 15 pages.
International Search Report and Written Opinion received for PCT Application No. PCT/US2020/24158, dated Jul. 6, 2020, 18 pages.
International Search Report and Written Opinion received for PCT Application No. PCT/US2020/24251, dated Jul. 6, 2020, 11 pages.
International Search Report and Written Opinion received for PCT Application No. PCT/US2020/24267, dated Jul. 6, 2020, 9 pages.
International Search Report and Written Opinion received for PCT Patent Application No. PCT/US20/24303, dated Oct. 21, 2020, 9 pages.
Ramakrishnan et al., RFC 3168, "The addition of Explicit Congestion Notification (ECN) to IP", Sep. 2001 (Year: 2001).

* cited by examiner

SYSTEM AND METHOD FOR FACILITATING EFFICIENT MANAGEMENT OF NON-IDEMPOTENT OPERATIONS IN A NETWORK INTERFACE CONTROLLER (NIC)

BACKGROUND

Field

This is generally related to the technical field of networking. More specifically, this disclosure is related to systems and methods for facilitating a network interface controller (NIC) with efficient management of non-idempotent operations.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (IOT) can generate different types of traffic with distinctive characteristics. As a result, in addition to conventional network performance metrics such as bandwidth and delay, network architects continue to face challenges such as scalability, versatility, and efficiency.

SUMMARY

A network interface controller (NIC) capable of efficient management of non-idempotent operations is provided. The NIC that can be equipped with a network interface, storage management logic block, and an operation management logic block. During operation, the network interface can receive a request for an operation from a remote device. The storage management logic block can store outcomes of operation executed by the NIC in a local data structure. The operation management logic block can determine whether the NIC has previously executed the operation. If the NIC has previously executed the operation, the operation management logic block can obtain an outcome of the operation from the data structure and generate a response comprising the obtained outcome for responding to the request.

BRIEF DESCRIPTION OF THE FIGURES

In the figures, like reference numerals refer to the same figure elements.

DETAILED DESCRIPTION

Figure 1:
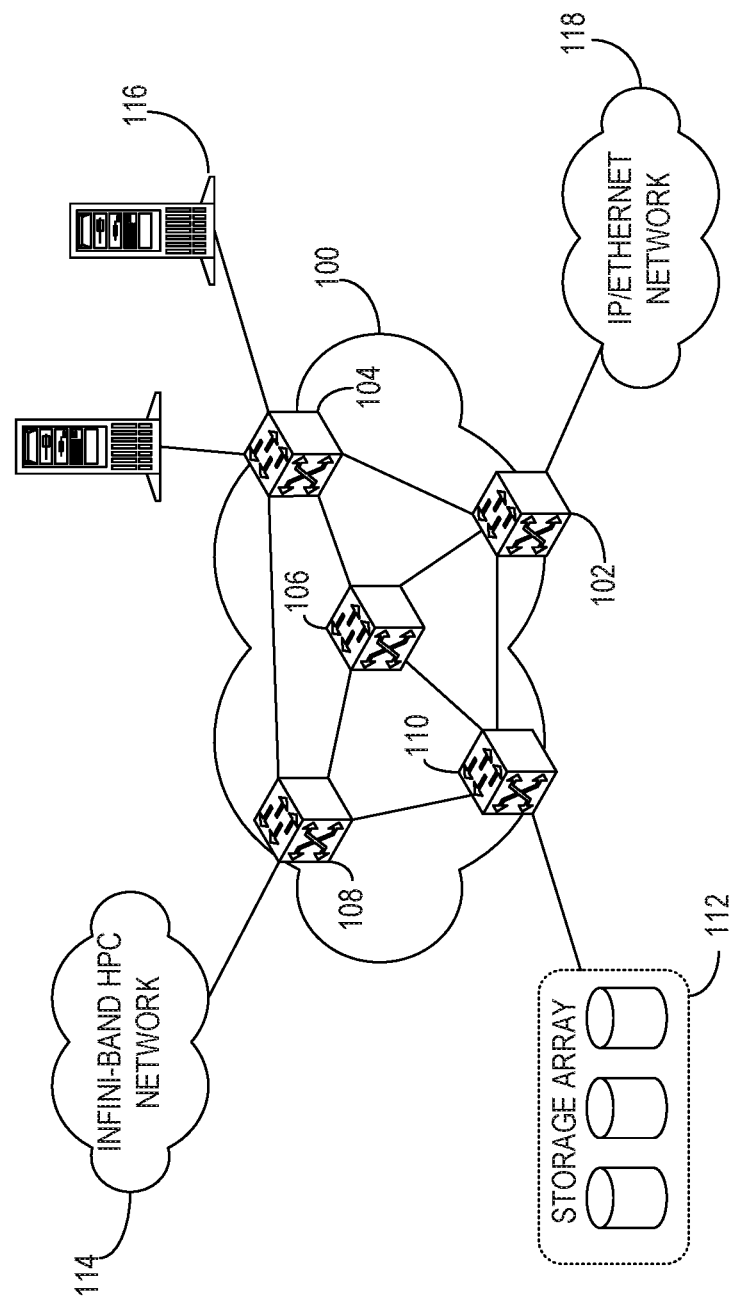
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Overview

The present disclosure describes systems and methods that facilitate dynamic management for non-idempotent operations in a network interface controller (NIC). The NIC allows a host to communicate with a data-driven network.

The embodiments described herein solve the problem of ensuring proper execution of remotely-requested non-idempotent operations by (i) storing the outcome (or result) of the non-idempotent operations, which can be issued from a remote source, at a target NIC until acknowledged from the source, and (ii) upon receiving a request for an already-executed operation from the source, generating a response with the stored outcome. In this way, the NIC may avoid re-execution of a non-idempotent operation even if the source reissues the request.

During operation, an application, which may run on a source device of a NIC, can request a data operation (e.g., a "GET" or a "PUT" command of remote direct memory access (RDMA)) for a memory location of a remote target device. The NIC of the target device can receive the request, facilitate the execution of the operation, and send a response with the outcome of the execution. Examples of an outcome can include, but are not limited to, one or more values generated from a computation associated with the operation, an indicator that indicates successful or unsuccessful execution of the operation, a memory location or index associated with the operation, and information indicating the state of a data structure based on the execution of the operation on the data structure. The NICs of the source and target devices can be referred to as the source and target NICs, respectively. The operation can be an idempotent or a non-idempotent operation. An idempotent operation may be executed more than once without causing an error. On the other hand, a non-idempotent operation can be executed once. Executing a non-idempotent operation more than once may cause an error.

Typically, RDMA operations may include more non-idempotent operations than idempotent operations. Examples of non-idempotent operations can include, but are not limited to atomic memory operations, adding data to a queue, and indicating the completion of an operation. Since RDMA operations can be issued from a source device and transferred across a switch fabric to a target device, these operations are executed based on a request-response communication protocol between the source and target NICs. Under such circumstances, if a source NIC issues a request for an operation and does not receive a response, either the request or the response can be lost (e.g., due to packet loss in the switch fabric). For non-idempotent operations, such a loss may cause the source NIC to determine that operation has not been performed.

However, the source NIC may not distinguish whether the request or the response is lost. As a result, the source NIC may not be able to determine whether the target has already executed the operation. Consequently, the source NIC may reissue the request for the operation. Upon receiving the reissued request, the target NIC may re-execute the operation (e.g., if the response has been lost). Repeating the execution of a non-idempotent operation may cause an error. For example, if the operation is an enqueue operation, repeating the execution can cause the target NIC to erroneously enter an additional element in a queue.

To solve this problem, the source NIC can generate an indicator that indicates whether a requested operation is a non-idempotent operation. The source NIC can then include the request in a packet and send the packet to a target NIC via a switch fabric. The source NIC can include the indicator in the request (e.g., as a parameter of the request) or the packet (e.g., in the header of the packet). Upon receiving the request, the target NIC can determine that the requested operation is a non-idempotent operation based on the indicator. The target NIC can then store an indicator, which can be the received indicator or a locally generated one, indicating that the request is for a non-idempotent operation. The target NIC can also store the outcome of the operation in a local data structure. The target NIC can then generate a response based on the outcome, include the response in a packet, and send the packet to the source NIC.

If the target NIC receives a request for the same operation, the target NIC can determine that the request has been repeated by inspecting the stored outcomes. Accordingly, the target NIC can determine that the response sent to the source NIC may have been lost. Consequently, the target NIC can obtain the stored outcome from the data structure and return a response with the stored outcome, thereby avoiding the repetition of a non-idempotent operation. When the source NIC receives the response, the source NIC can send an acknowledgment piggybacked in a subsequent request message. Upon receiving the acknowledgment, the target NIC may remove the outcome from the data structure. The operation can be part of a sequence of operations. The source NIC can then use cumulative acknowledgment for a set of sequential responses. The target NIC may clear a corresponding set of outcomes based on the cumulative acknowledgment.

One embodiment of the present invention provides a NIC that can be equipped with a network interface, storage management logic block, and an operation management logic block. During operation, the network interface can receive a request for an operation from a remote device. The storage management logic block can store, in a local data structure, outcome of operations executed by the NIC. The operation management logic block can determine whether the NIC has previously executed the operation. If the NIC has previously executed the operation, the operation management logic block can obtain an outcome of the operation from the data structure and generate a response comprising the obtained outcome for responding to the request.

In a variation on this embodiment, the operation management logic block can determine whether the operation has been previously executed based on a sequence number of the operation and an expected sequence number.

In a variation on this embodiment, the operation management logic block can determine whether the operation is a non-idempotent operation based on an indicator in the request.

In a variation on this embodiment, if the operation has previously not been executed, the operation management logic block can execute the operation to generate the outcome.

In a further variation, the storage management logic block can store the generated outcome in the data structure.

In a variation on this embodiment, the storage management logic block may identify an acknowledgment associated with a sequence number in the request and remove a set of outcomes from the data structure based on the acknowledgment.

In a variation on this embodiment, the operation is in a set of sequential operations, which should be executed in order.

In a variation on this embodiment, the operation corresponds to an RDMA command.

Figure 2A:
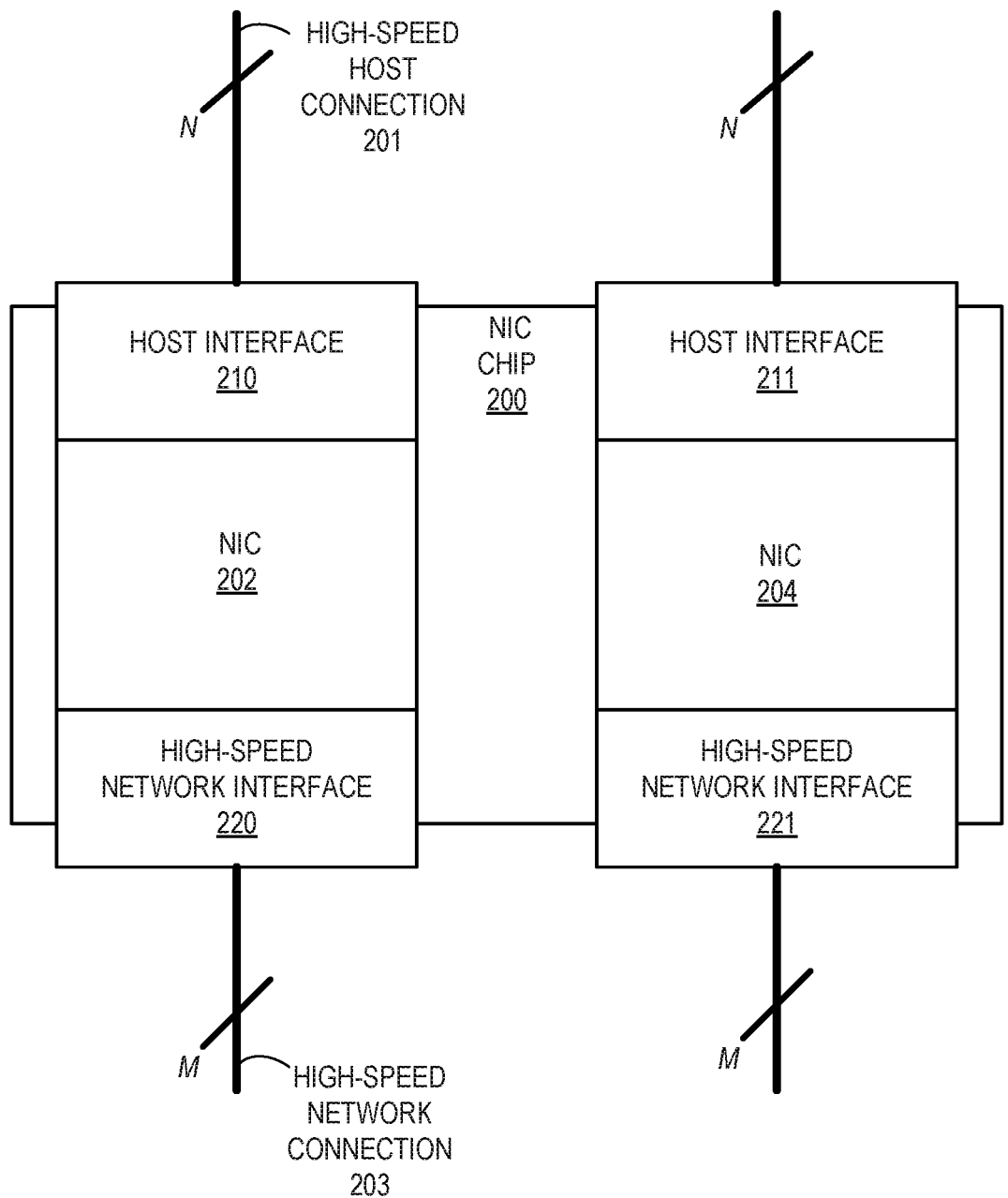
FIG. 2A shows an exemplary NIC chip with a plurality of NICs.

In this disclosure, the description in conjunction with FIG. 1 is associated with the network architecture and the description in conjunction with FIG. 2A and onward provide more details on the architecture and operations associated with a NIC that supports efficient management of non-idempotent operations.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a NIC of an edge device (for example, an HPC end host) to an ingress edge port of an edge switch. Switch fabric 100 can then transport the traffic to an egress edge switch, which in turn can deliver the traffic to a destination edge device via another NIC.

Exemplary NIC Architecture

FIG. 2A shows an exemplary NIC chip with a plurality of NICs. With reference to the example in FIG. 1, a NIC chip 200 can be a custom application-specific integrated circuit (ASIC) designed for host 116 to work with switch fabric 100. In this example, chip 200 can provide two independent NICs 202 and 204. A respective NIC of chip 200 can be equipped with a host interface (HI) (e.g., an interface for connecting to the host processor) and one High-speed Network Interface (HNI) for communicating with a link coupled to switch fabric 100 of FIG. 1. For example, NIC 202 can include an HI 210 and an HNI 220, and NIC 204 can include an HI 211 and an HNI 221.

In some embodiments, HI 210 can be a peripheral component interconnect (PCI) or a peripheral component interconnect express (PCIe) interface. HI 210 can be coupled to a host via a host connection 201, which can include N (e.g., N can be 16 in some chips) PCIe Gen 4 lanes capable of operating at signaling rates up to 25 Gbps per lane. HNI 210 can facilitate a high-speed network connection 203, which can communicate with a link in switch fabric 100 of FIG. 1. HNI 210 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. HNI 220 can support the Institute of Electrical and Electronics Engineers (IEEE) 802.3 Ethernet-based protocols as well as an enhanced frame format that provides support for higher rates of small messages.

NIC 202 can support one or more of: point-to-point message passing based on Message Passing Interface (MPI), remote memory access (RMA) operations, offloading and progression of bulk data collective operations, and Ethernet packet processing. When the host issues an MPI message, NIC 202 can match the corresponding message type. Furthermore, NIC 202 can implement both eager protocol and rendezvous protocol for MPI, thereby offloading the corresponding operations from the host.

Furthermore, the RMA operations supported by NIC 202 can include PUT, GET, and Atomic Memory Operations (AMO). NIC 202 can provide reliable transport. For example, if NIC 202 is a source NIC, NIC 202 can provide a retry mechanism for idempotent operations. Furthermore, connection-based error detection and retry mechanism can be used for ordered operations that may manipulate a target state. The hardware of NIC 202 can maintain the state necessary for the retry mechanism. In this way, NIC 202 can remove the burden from the host (e.g., the software). The policy that dictates the retry mechanism can be specified by the host via the driver software, thereby ensuring flexibility in NIC 202.

Furthermore, NIC 202 can facilitate triggered operations, a general-purpose mechanism for offloading, and progression of dependent sequences of operations, such as bulk data collectives. NIC 202 can support an application programming interface (API) (e.g., libfabric API) that facilitates fabric communication services provided by switch fabric 100 of FIG. 1 to applications running on host 116. NIC 202 can also support a low-level network programming interface, such as Portals API. In addition, NIC 202 can provide efficient Ethernet packet processing, which can include efficient transmission if NIC 202 is a sender, flow steering if NIC 202 is a target, and checksum computation. Moreover, NIC 202 can support virtualization (e.g., using containers or virtual machines).

Figure 2B:
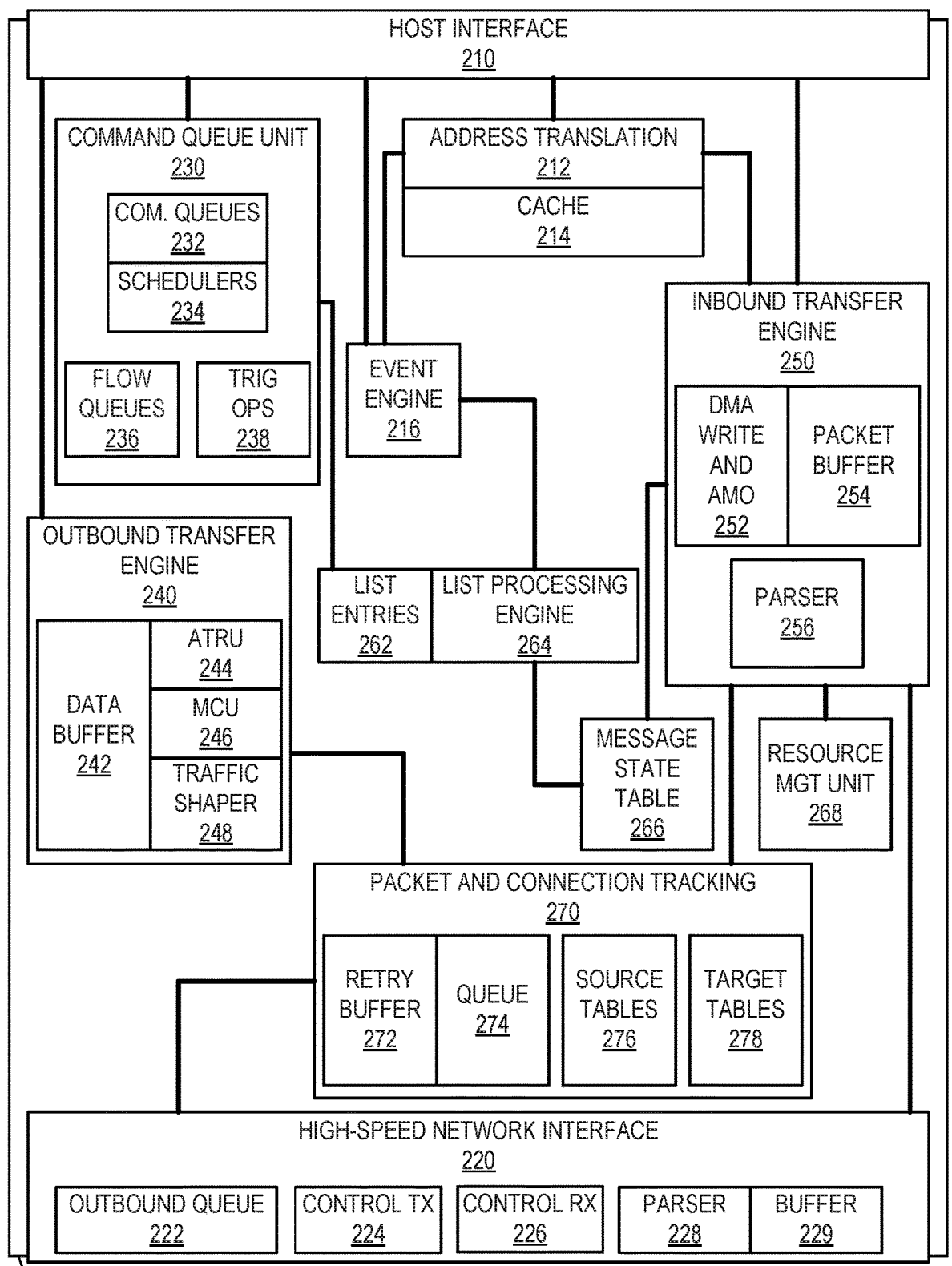
FIG. 2B shows an exemplary architecture of a NIC.

FIG. 2B shows an exemplary architecture of a NIC. In NIC 202, the port macro of HNI 220 can facilitate low-level Ethernet operations, such as physical coding sublayer (PCS) and media access control (MAC). In addition, NIC 202 can provide support for link layer retry (LLR). Incoming packets can be parsed by parser 228 and stored in buffer 229. Buffer 229 can be a PFC Buffer provisioned to buffer a threshold amount (e.g., one microsecond) of delay bandwidth. HNI 220 can also include control transmission unit 224 and control reception unit 226 for managing outgoing and incoming packets, respectively.

NIC 202 can include a Command Queue (CQ) unit 230. CQ unit 230 can be responsible for fetching and issuing host side commands. CQ unit 230 can include command queues 232 and schedulers 234. Command queues 232 can include two independent sets of queues for initiator commands (PUT, GET, etc.) and target commands (Append, Search, etc.), respectively. Command queues 232 can be implemented as circular buffers maintained in the memory of NIC 202. Applications running on the host can write to command queues 232 directly. Schedulers 234 can include two separate schedulers for initiator commands and target commands, respectively. The initiator commands are sorted into flow queues 236 based on a hash function. One of flow queues 236 can be allocated to a unique flow. Furthermore, CQ unit 230 can further include a triggered operations module (or logic block) 238, which is responsible for queuing and dispatching triggered commands.

Outbound transfer engine (OXE) 240 can pull commands from flow queues 236 in order to process them for dispatch. OXE 240 can include an address translation request unit (ATRU) 244 that can send address translation requests to address translation unit (ATU) 212. ATU 212 can provide virtual to physical address translation on behalf of different engines, such as OXE 240, inbound transfer engine (IXE) 250, and event engine (EE) 216. ATU 212 can maintain a large translation cache 214. ATU 212 can either perform translation itself or may use host-based address translation services (ATS). OXE 240 can also include message chopping unit (MCU) 246, which can fragment a large message into packets of sizes corresponding to a maximum transmission unit (MTU). MCU 246 can include a plurality of MCU modules. When an MCU module becomes available, the MCU module can obtain the next command from an assigned flow queue. The received data can be written into data buffer 242. The MCU module can then send the packet header, the corresponding traffic class, and the packet size to traffic shaper 248. Shaper 248 can determine which requests presented by MCU 246 can proceed to the network.

Subsequently, the selected packet can be sent to packet and connection tracking (PCT) 270. PCT 270 can store the packet in a queue 274. PCT 270 can also maintain state information for outbound commands and update the state information as responses are returned. PCT 270 can also maintain packet state information (e.g., allowing responses to be matched to requests), message state information (e.g., tracking the progress of multi-packet messages), initiator completion state information, and retry state information (e.g., maintaining the information required to retry a command if a request or response is lost). If a response is not returned within a threshold time, the corresponding command can be stored in retry buffer 272. PCT 270 can facilitate connection management for initiator and target commands based on source tables 276 and target tables 278, respectively. For example, PCT 270 can update its source tables 276 to track the necessary state for reliable delivery of the packet and message completion notification. PCT 270 can forward outgoing packets to HNI 220, which stores the packets in outbound queue 222.

NIC 202 can also include an IXE 250, which provides packet processing if NIC 202 is a target or a destination. IXE 250 can obtain the incoming packets from HNI 220. Parser 256 can parse the incoming packets and pass the corresponding packet information to a List Processing Engine (LPE) 264 or a Message State Table (MST) 266 for matching. LPE 264 can match incoming messages to buffers. LPE 264 can determine the buffer and start address to be used by each message. LPE 264 can also manage a pool of list entries 262 used to represent buffers and unexpected messages. MST 266 can store matching results and the information required to generate target side completion events. MST 266 can be used by unrestricted operations, including multi-packet PUT commands, and single-packet and multi-packet GET commands.

Subsequently, parser 256 can store the packets in packet buffer 254. IXE 250 can obtain the results of the matching for conflict checking. DMA write and AMO module 252 can then issue updates to the memory generated by write and AMO operations. If a packet includes a command that generates target side memory read operations (e.g., a GET response), the packet can be passed to the OXE 240. NIC 202 can also include an EE 216, which can receive requests to generate event notifications from other modules or units in NIC 202. An event notification can specify that either a fill event or a counting event is generated. EE 216 can manage event queues, located within host processor memory, to which it writes full events. EE 216 can forward counting events to CQ unit 230.

Dynamic Operations Management in NIC

Figure 3:
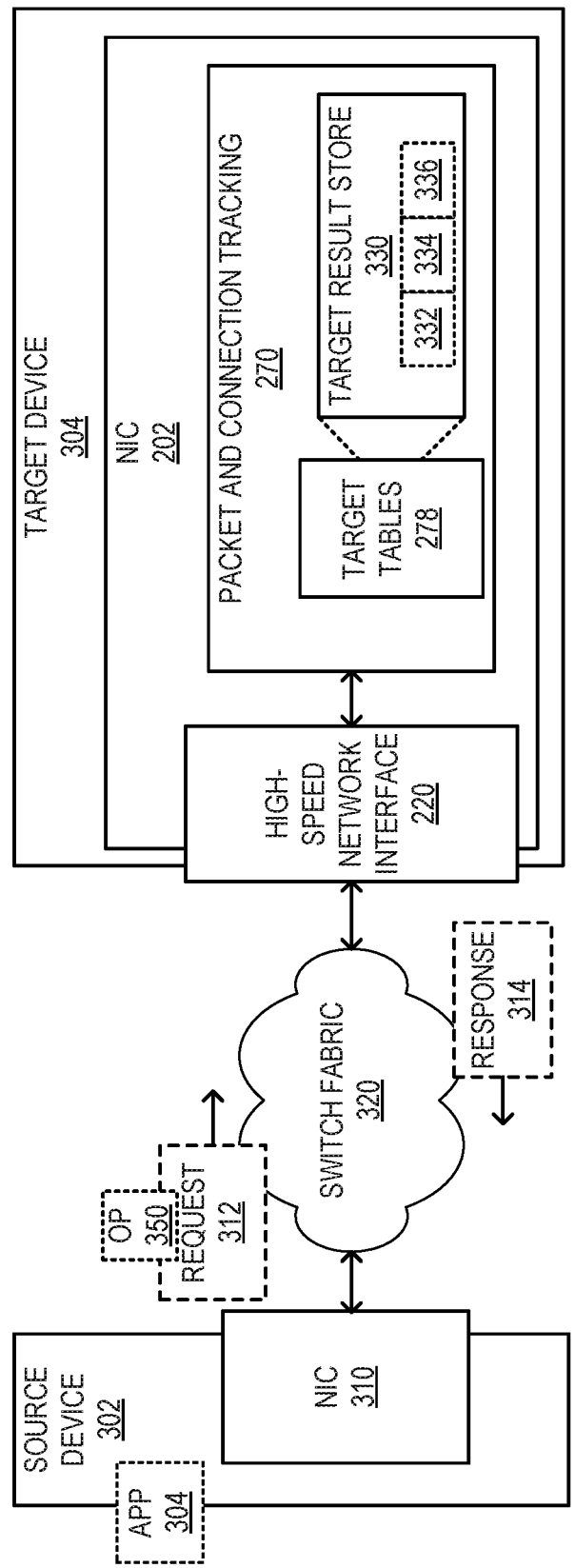
FIG. 3 shows an exemplary dynamic management process for non-idempotent operations in a NIC.

FIG. 3 shows an exemplary dynamic management process for non-idempotent operations in a NIC. In this example, devices 302 and 304 can be coupled with each other via switch fabric 320. Devices 302 and 304 can be equipped with NICs 310 and 202, respectively. During operation, an application 304 running on device 302 can issue a request 312 for a data operation 350 (e.g., an RDMA operation) for a memory location of device 304. Since device 302 is the source and device 304 is the target of request 312, devices 302 and 304 can be referred to as source and target devices, respectively, for request 312. NIC 202 can receive the request, facilitate the execution of operation 350, and send a response 314 with the outcome of the execution of operation 350. Examples of the outcome can include, but are not limited to, one or more values generated from a computation associated with operation 350, an indicator that indicates successful or unsuccessful execution of operation 350, a memory location or index associated with operation 350, and information indicating the state of a data structure based on the execution of operation 350 on the data structure.

Suppose that operation 350 is a non-idempotent operation. Since request 312 can be issued from device 302 and transferred across switch fabric 320 to device 304, operation 350 is executed based on a request-response communication protocol between devices 302 and 304. Under such circumstances, if device 302 issues request 312 and does not receive response 314, either request 312 or response 314 can be lost (e.g., due to packet loss in switch fabric 320). Such a loss may cause device 302 to determine that operation has not been performed. Since operation 350 can be a non-idempotent operation, device 302 may determine that operation 350 should be performed.

Device 302 may not distinguish whether request 312 or response 314 is lost. As a result, device 302 may not be able to determine whether operation 350 has been executed by device 304. Hence, device 302 may reissue request 312 for operation 350 even if device 304 has already executed operation 350. Consequently, upon receiving reissued request 312, device 304 may re-execute operation 350. Repeating the execution of non-idempotent operation 350 may cause an error. For example, if operation 350 is an enqueue operation, re-execution of operation 350 can cause device 304 to erroneously enter an additional element in a queue.

To solve this problem, NIC 310 can generate an indicator that indicates whether operation 350 is a non-idempotent operation. NIC 310 can then include request 312 in a packet and send the packet to NIC 202 via switch fabric 320. NIC 310 can include the indicator in request 312 or the packet. Upon receiving request 312, NIC 202 can determine that operation 350 is a non-idempotent operation based on the indicator. NIC 202 can then store an indicator, which can be the received indicator or a locally generated one, indicating that request 312 is for a non-idempotent operation. NIC 202 can also store outcome (or result) 336 of operation 350 in a local data structure 330. Data structure 330 can be referred to as a target result store (TRS). TRS 330 can be in target tables 278 of PCT 270 of NIC 202.

NIC 202 can then generate response 314 based on outcome 336, include response 314 in a packet, and sends the packet to NIC 302. If NIC 202 receives request 312 again, NIC 202 can determine that request 312 has been repeated by inspecting a sequence number of operation 350 and an expected sequence number. For example, if operation 350 is repeated, the sequence number of operation 350 can be smaller than the expected sequence number (e.g., between the sequence number of the last acknowledged response and the sequence number of the next expected new request). Accordingly, NIC 202 can determine that response 314 sent to NIC 310 may have been lost. Consequently, NIC 202 can obtain outcome 336 from TRS 330 and return response 314 with outcome 336. In this way, NIC 202 can reissue response 314 without repeating non-idempotent operation 350.

In some embodiments, operation 350 can be part of a set of ordered operations that should be executed sequentially. NIC 310 can include a sequence number in request 312 indicating the order of operation 350. Furthermore, NIC 310 can send an acknowledgment piggybacked request 312 for operations that have been successfully responded back to NIC 310. For example, TRS 330 can store outcomes 332 and 334 of operations that have been executed prior to the execution of operation 350. Upon receiving outcomes 332 and 334 from NIC 202, NIC 310 can include an acknowledgment for outcome 334.

Since the operations should be executed in order, the acknowledgment can cumulatively acknowledge outcomes 332 and 334. In other words, the acknowledgment can instruct NIC 202 to clear all outcomes up to outcome 334 from TRS 330. In the same way, when NIC 310 receives response 314, NIC 312 can send an acknowledgment piggybacked in a subsequent request message. Upon receiving the acknowledgment, NIC 202 may remove outcome 336 from TRS 330.

Figure 4A:
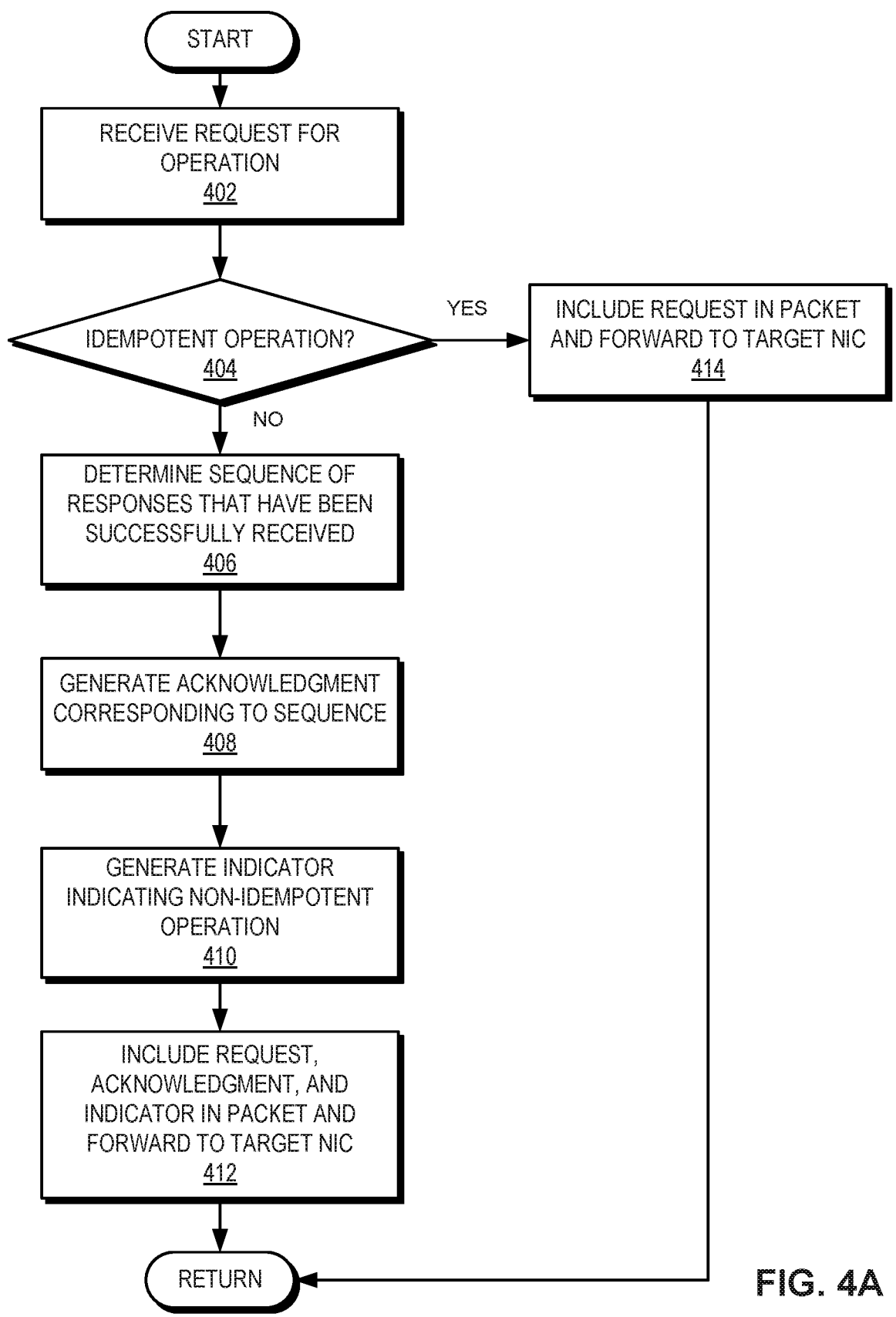
FIG. 4A shows a flow chart of a dynamic management process for non-idempotent operations in a source NIC.

FIG. 4A shows a flow chart of a dynamic management process for non-idempotent operations in a source NIC. During operation, the NIC may receive a request for an operation (e.g., from a flow queue or a retry buffer of the NIC) (operation 402) and check whether the operation is an idempotent operation (operation 404). If the operation is an idempotent operation, the NIC can include the request in a packet and forward the packet to a target NIC (operation 414). On the other hand, if the operation is a non-idempotent operation, the NIC can determine a sequence of responses that have been successfully received (operation 406). The NIC can then generate an acknowledgment corresponding to the sequence (operation 408) and an indicator indicating a non-idempotent operation (operation 410). Subsequently, the NIC can include the request, the acknowledgment, and the indicator in the packet and forward the packet to the target NIC (operation 412). It should be noted that the request can be allocated to an MCU module and selected for forwarding based on arbitration, as described in conjunction with FIG. 2B.

Figure 4B:
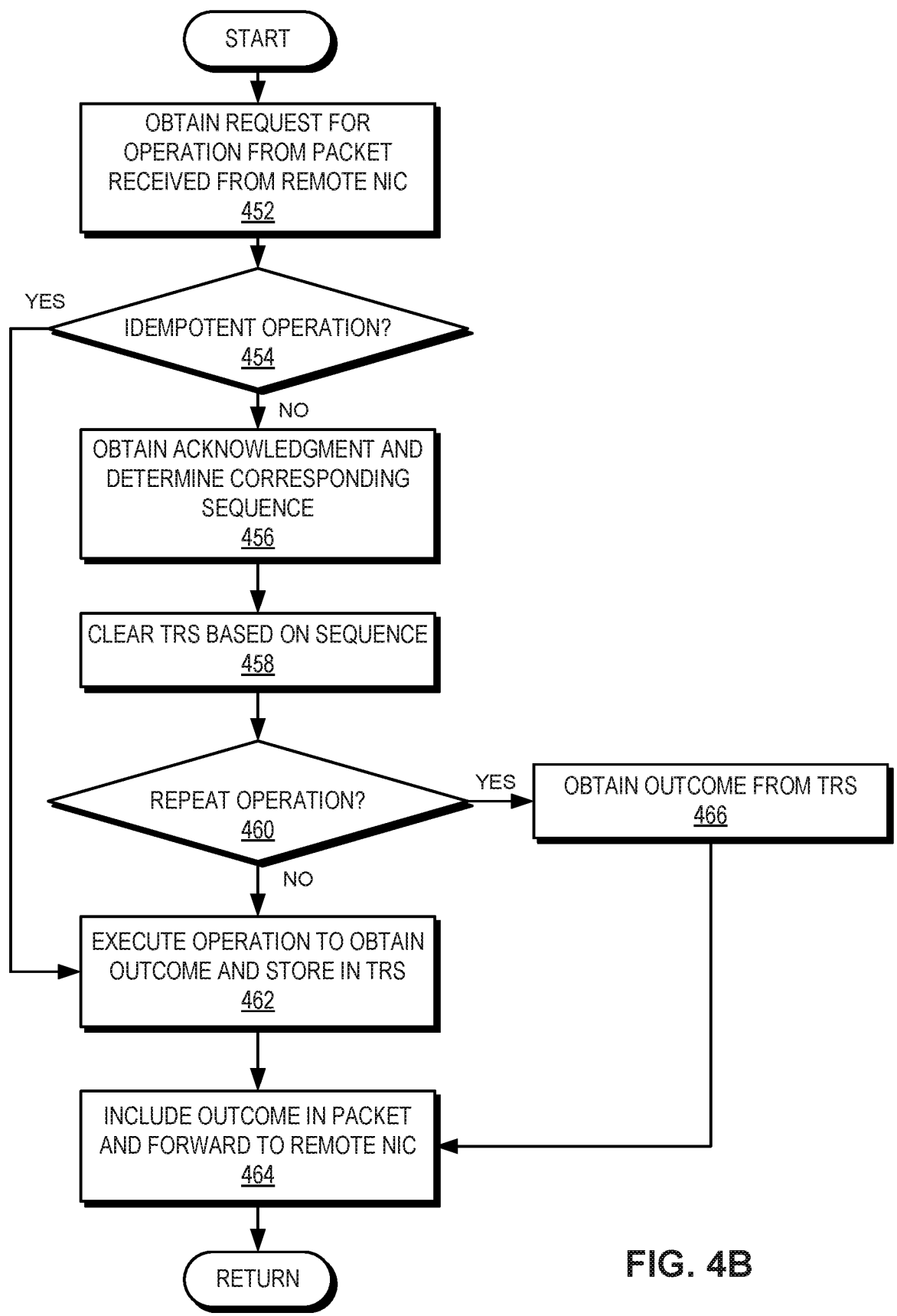
FIG. 4B shows a flow chart of a dynamic management process for non-idempotent operations in a target NIC.

FIG. 4B shows a flow chart of a dynamic management process for non-idempotent operations in a target NIC. During operation, the NIC may obtain a request for an operation from a packet received from a remote NIC (operation 452) and check whether the operation is an idempotent operation (operation 454). If the operation is a non-idempotent operation, the NIC can obtain an acknowledgment from the packet and determine a corresponding sequence (operation 456). The NIC can then clear the TRS based on the sequence (operation 458). Subsequently, the NIC can check whether the operation is a repeat operation (e.g., by comparing a sequence number of the operation and an expected sequence number) (operation 460).

If the operation is an idempotent operation (operation 454) or the operation is not a repeat operation (operation 460), the NIC can execute the operation to obtain an outcome and store the outcome in the TRS (operation 462). On the other hand, if the operation is a repeat operation (e.g., the sequence number of the operation is smaller than the expected sequence number), the NIC can obtain the outcome from the TRS (operation 466). Upon obtaining the outcome (operation 462 or 466), the NIC can include the outcome in a packet and forward the packet to the remote NIC (operation 464).

Exemplary Computer System

Figure 5:
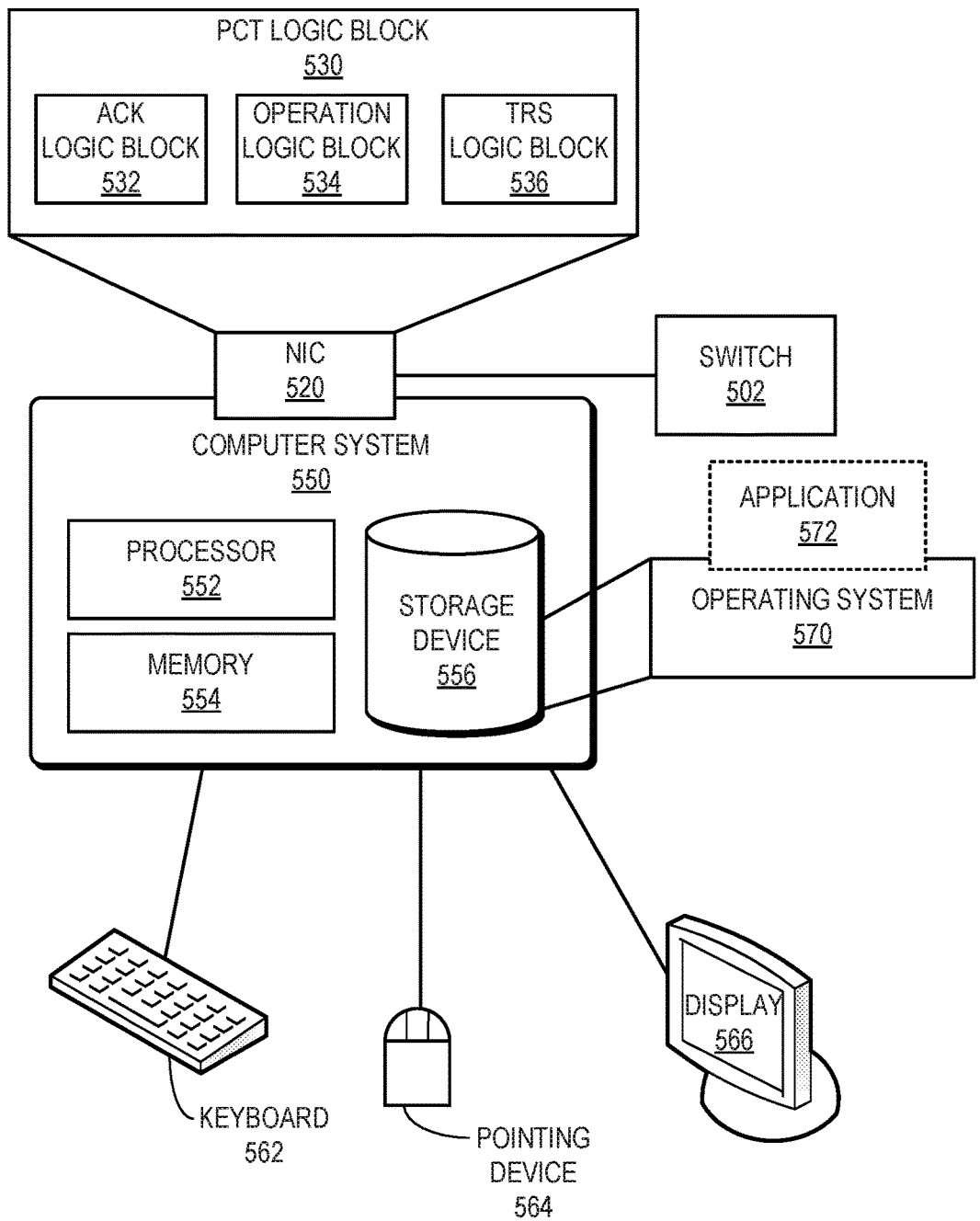
FIG. 5 shows an exemplary computer system equipped with a NIC that facilitates dynamic management of non-idempotent operations.

FIG. 5 shows an exemplary computer system equipped with a NIC that facilitates dynamic management of non-idempotent operations. Computer system 550 includes a processor 552, a memory device 554, and a storage device 556. Memory device 554 can include a volatile memory device (e.g., a dual in-line memory module (DIMM)). Furthermore, computer system 550 can be coupled to a keyboard 562, a pointing device 564, and a display device 566. Storage device 556 can store an operating system 570. An application 572 can operate on operating system 570.

Computer system 550 can be equipped with a host interface coupling a NIC 520 that facilitates efficient data request management. NIC 520 can provide one or more HNIs to computer system 550. NIC 520 can be coupled to a switch 502 via one of the HNIs. NIC 520 can include a PCT logic block 530, as described in conjunction with FIGS. 2B and 3. If NIC 520 operates as a source NIC, PCT logic block 530 can include an acknowledgment (ACK) logic block 532 that can generate cumulative acknowledgments for responses received from a target NIC. If NIC 520 operates as a target NIC, PCT logic block 530 can include an operation logic block 534 that can execute an operation associated with a request from a source NIC.

PCT logic block 530 can also include an TRS logic block 536 that can store the outcome of the execution of an operation in a local data structure (e.g., in memory device 554). TRS logic block 536 can remove (or clear) outcomes from the data structure based on cumulative acknowledgments. Operation logic block 534 can also determine whether an outcome of an operation is already stored in the data structure. If the outcome is already in the data structure, operation logic block 534 may obtain the outcome from the data structure instead of executing the operation. Upon generating the outcome, NIC 520 can include the outcome in a packet and forward the packet to the source NIC.

In summary, the present disclosure describes a NIC that facilitates efficient management of non-idempotent operations. The NIC can be equipped with a network interface, storage management logic block, and an operation management logic block. During operation, the network interface can receive a request for an operation from a remote device. The storage management logic block can store, in a local data structure, outcome of operations executed by the NIC. The operation management logic block can determine whether the NIC has previously executed the operation. If the NIC has previously executed the operation, the operation management logic block can obtain an outcome of the operation from the data structure and generate a response comprising the obtained outcome for responding to the request.

The methods and processes described above can be performed by hardware logic blocks, modules, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A network interface controller (NIC), comprising:
a network interface to receive a request for an operation from a remote device, wherein the request includes an acknowledgment corresponding to a sequence of responses successfully received by the remote device;
a storage management logic block to:
store, in a local data structure, outcome of operations executed by the network interface controller;
obtain, from the request, the acknowledgement corresponding to the sequence of successfully received responses; and
remove, from the data structure, a set of outcomes based on the sequence of successfully received responses; and
an operation management logic block to:
determine whether the operation has been previously executed by the network interface controller;
in response to determining that the operation has previously been executed, obtain an outcome of the operation from the data structure; and
generate a response comprising the obtained outcome for responding to the request.

2. The network interface controller of claim 1, wherein the operation management logic block is further to determine whether the operation has been previously executed based on a sequence number of the operation and an expected sequence number.

3. The network interface controller of claim 1, wherein the operation management logic block is further to determine whether the operation is a non-idempotent operation based on an indicator in the request.

4. The network interface controller of claim 1, wherein, in response to determining that the operation has previously not been executed, the operation management logic block is further to execute the operation to generate the outcome.

5. The network interface controller of claim 4, wherein the storage management logic block is further to store the generated outcome in the data structure.

6. The network interface controller of claim 1
wherein a respective response of the sequence of responses is associated with a respective sequence number.

7. The network interface controller of claim 1, wherein the operation is among a set of sequential operations that are to be executed in order.

8. The network interface controller of claim 1, wherein the operation corresponds to a remote direct memory access (RDMA) command.

9. A method, comprising:
receiving, by a network interface controller (NIC), a request for an operation from a remote device, wherein the request includes an acknowledgment corresponding to a sequence of responses successfully received by the remote device;
storing, in a local data structure of the NIC, outcome of operations executed by the NIC;

obtaining, from the request, the acknowledgement corresponding to the sequence of successfully received responses;

removing, from the data structure, a set of outcomes based on the sequence of successfully received responses;

determining whether the operation has previously been executed by the NIC;

in response to determining that the operation has previously been executed, obtaining an outcome of the operation from the data structure; and generating a response comprising the obtained outcome for responding to the request.

10. The method of claim 9, further comprising determining whether the operation has been previously executed based on a sequence number of the operation and an expected sequence number.

11. The method of claim 9, further comprising determining whether the operation is a non-idempotent operation based on an indicator in the request.

12. The method of claim 9, further comprising, in response to determining that the operation has previously not been executed, executing the operation to generate the outcome.

13. The method of claim 12, further comprising storing the generated outcome in the data structure.

14. The method of claim 9, wherein a respective response of the sequence of responses is associated with a respective sequence number.

15. The method of claim 9, wherein the operation is among a set of sequential operations that are to be executed in order.

16. The method of claim 9, wherein the operation is a remote direct memory access (RDMA) command.

17. A computer system, comprising:
a processor;
a memory device; and
a host interface to couple the NIC;
wherein the NIC comprises:
a network interface to receive a request for an operation from a remote device, wherein the request includes an acknowledgment corresponding to a sequence of responses successfully received by the remote device;
a storage management logic block, in a data structure in the NIC, to:
store outcomes of operations executed by the NIC;
obtain, from the request, the acknowledgement corresponding to the sequence of successfully received responses; and
remove, from the data structure, a set of outcomes based on the sequence of successfully received responses; and
an operation management logic block to:
determine whether the operation has previously been executed by the NIC;
in response to determining that the operation has previously been executed, obtain an outcome of the operation from the data structure; and
generate a response comprising the obtained outcome for responding to the request.

18. The computer system of claim 17, wherein the operation management logic block is further to determine whether the operation is a non-idempotent operation based on an indicator in the request.

19. The computer system of claim 17, wherein, in response to determining that the operation has not been executed, the operation management logic block is further to execute the operation to generate the outcome and store the generated outcome in the data structure.

20. The computer system of claim 17,
wherein a respective response of the sequence of responses is associated with a respective sequence number.

* * * * *